United States Patent [19]
Gertel et al.

[11] Patent Number: 5,532,857
[45] Date of Patent: Jul. 2, 1996

[54] WIDE DYNAMIC RANGE OPTICAL LINK USING DSSC LINEARIZER

[75] Inventors: Eitan Gertel, Lansdale, Pa.; Donald L. Sipes, Jr., Lisle, Ill.

[73] Assignees: AEL Industries, Inc., Lansdale, Pa.; Amoco Corporation, Chicago, Ill.

[21] Appl. No.: 303,104

[22] Filed: Sep. 7, 1994

[51] Int. Cl.[6] ..................................... H04B 10/00
[52] U.S. Cl. ..................... 359/154; 359/181; 359/187; 359/134; 359/160
[58] Field of Search ........................... 359/160, 154, 359/134, 173, 179, 181, 183, 187–188, 341, 124; 372/6; 385/4, 8

[56] References Cited

U.S. PATENT DOCUMENTS

| | | | |
|---|---|---|---|
| 4,769,853 | 9/1988 | Goodwin et al. | 455/616 |
| 5,031,235 | 7/1991 | Raskin et al. | 455/612 |
| 5,161,044 | 11/1992 | Nazarathy et al. | 359/157 |
| 5,161,206 | 11/1992 | Djupsjobacka | 385/2 |
| 5,287,212 | 2/1994 | Cox et al. | 359/160 |
| 5,331,449 | 7/1994 | Huber et al. | 359/160 |

OTHER PUBLICATIONS

Kwong et al. "Coherent Subcarrier Fiber–Optic Communication Systems With Phase–Noise Cancellation" IEEE Transactions on Communications, vol. 42, No. 6, Jun. 1994, pp. 2208–2212.

Primary Examiner—Leo Boudreau
Assistant Examiner—Kinfe-Michael Negash
Attorney, Agent, or Firm—Seidel, Gonda, Lavorgna, & Monaco

[57] ABSTRACT

A wide dynamic range optical link using a double sideband suppressed carrier linearizer, the link comprising a laser source for producing a lightwave carrier output at a predetermined power level and wavelength, a double sideband suppressed carrier optical modulator having the lightwave carrier as a first input and an RF information-bearing signal as a second input, said double sideband suppressed carrier modulator comprising a signal splitter for dividing the lightwave carrier into primary and secondary carriers, a Mach-Zehnder optical modulator producing a modulated signal comprising information sidebands and a primary carrier component, a feedback controlled phase shifter in which the secondary carrier is shifted 180 degrees from the primary carrier phase, a signal combiner into which are input the modulated signal and the phase shifted secondary carrier, the combination of said signals causing the controlled suppression of the carrier component in the output of the signal combiner. A feedback loop controls the phase shifter. The double sideband suppressed carrier modular produces a suppressed carrier modulated signal output that is coupled to a linear optical amplifier for increasing the effective modulation index of the modulated signal output from the suppressed-carrier modulator. The output of the linear optical amplifier is connected to an optical fiber medium for transmission of the modulated signal.

14 Claims, 5 Drawing Sheets

WIDE DYNAMIC RANGE OPTICAL LINK USING DSSC LINEARIZER

FIELD OF THE INVENTION

The invention relates to the field of optical fiber communications techniques. An optical communications link is described which improves the dynamic range of a modulated signal for transmission over an optical fiber medium, and detection at one or more receivers on the link.

BACKGROUND OF THE INVENTION

The inherent low loss, wide instantaneous bandwidth, lower bulk and light-weight over large distances make optical fiber communications an attractive choice over coaxially based systems. Fiber optic links have been demonstrated to operate from RF frequencies into the millimeter wave range. They employ an externally modulated approach based on the use of high power laser light sources as signal carriers. The availability of high power, low noise laser sources has enabled the design and implementation of analog fiber optic links in the microwave range which have 117 dB/Hz$^{2/3}$ spurious-free dynamic range without linearization.

An externally modulated system consists of a laser source, an external modulator, optical fiber, and at least one optical detector. A continuous wave laser is used to drive an optical wave modulator that imposes an RF information-bearing signal on the optical carrier lightwave. The typical modulator used is a Mach-Zehnder interferometer, an electro-optic device fabricated on a lithium-niobate (LiNbO$_3$) substrate. An RF information-bearing signal is impressed on a lightwave carrier within the modulator, yielding an amplitude-modulated signal which is coupled into a single mode fiber for transmission on a communications link. The modulated signal may be converted back to RF by an optical detector, commonly a PIN diode detector. The operational dynamic range of the link depends upon the total noise power at the detector, the maximum RF signal that can be detected, and the intermodulation distortion generated by the modulator.

The amplitude modulated output of the Mach-Zehnder modulator comprises a large carrier signal component and information-bearing upper and lower sidebands. The majority of the signal power transmitted on the optical link is concentrated in the carrier component; that is, that part of the signal output which does not convey information. The information is contained in the sidebands, which comprise a relatively small part of the optical power transmitted on the link. The ratio of signal power contained in the information bearing sidebands to the power of the carrier is termed the modulation index. The typical modulation index of an externally modulated optical link is on the order of 2–5% without further attempts to enhance the dynamic range of the link. The large carrier component in the modulator output produces a high DC level in the optical detector, thereby reducing its sensitivity to the much lower magnitude information signals on the link. This limits the dynamic range of the optical link.

Increasing the RF drive level to the optical modulator can increase the signal power of the information sidebands in the amplitude modulated output. However, because an electro-optical modulator, like its RF counterparts, is a non-linear device, it generates second and third harmonics and third-order intermodulation products when operated in the non-linear region of its transfer function. Thus, to keep the modulator operating in its linear region requires limiting the modulation index to a relatively low figure (on the order of 2–3%).

It is the concentration of signal power in the carrier, which carries no information, that limits the dynamic range in the optical link. A reduction of the carrier power coupled to the optical transmission fiber would improve the dynamic range of the optical link. Increasing the signal power of the information-bearing sidebands would further enhance dynamic range. This would improve the apparent modulation index of the signal coupled to the optical transmission medium by boosting the ratio of signal power to carrier power in the signal.

SUMMARY OF THE INVENTION

The present invention is a wide dynamic range optical link using a double sideband suppressed carrier linearizer to improve the effective modulation index of a modulated lightwave coupled to an optical fiber. The link comprises a laser source for producing a lightwave carrier output at a predetermined power level and wavelength. The carrier is coupled into a double sideband suppressed carrier optical modulator into which an RF information-bearing signal is a second input. The double sideband suppressed carrier modulator comprises a signal splitter for dividing the lightwave carrier into primary and second carriers, and a Mach-Zehnder optical modulator into which the primary carrier is input and modulated by the RF information signal. This produces a modulated signal comprising information sidebands and a primary carrier component.

The secondary carrier is coupled to a feedback controlled phase shifter where the secondary carrier is shifted 180° from the primary carrier phase. The modulated primary carrier and the phase-shifted secondary carrier are combined in a signal combiner causing suppression of the carrier component in the combiner output because of the 180° phase relation of the primary and secondary carriers. The link also comprises a closed-loop feedback network for controlling the phase shifter. The network comprises an optical detector for detecting the amplitude of the carrier component in the suppressed carrier signal and a means for providing a control signal derived from the detected carrier amplitude for controlling the phase shifter.

The link further comprises a linear optical amplifier for increasing the effective modulation index of the modulated signal output from the suppressed carrier modulator. The linear optical amplifier comprises a pumped diode laser illuminating a rare earth doped optical fiber segment, input wavelength division multiplexers and output wavelength division demultiplexers for enabling the suppressed carrier modulated signal to enter and exit the fiber segment, and an optical termination connected to the second end of the rare earth doped optical fiber, the optical wavelength division multiplexers and demultiplexers being connected to an optical fiber medium for transmission of the modulated signal. The link further comprises first and second optical isolators at the input and output of the amplifier respectively for preventing the pumped laser signal in the amplifier from feeding back into the modulator or forward into the optical fiber transmission medium. The rare earth doping elements in the amplifier fiber segment may include both ytterbium and erbium, or comprise only erbium. The Mach-Zehnder modulator, the signal splitter, and the phase shifter of the double sideband suppressed carrier modulator may be fabricated on a single lithium niobate substrate.

DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE INVENTION

Figure 1:
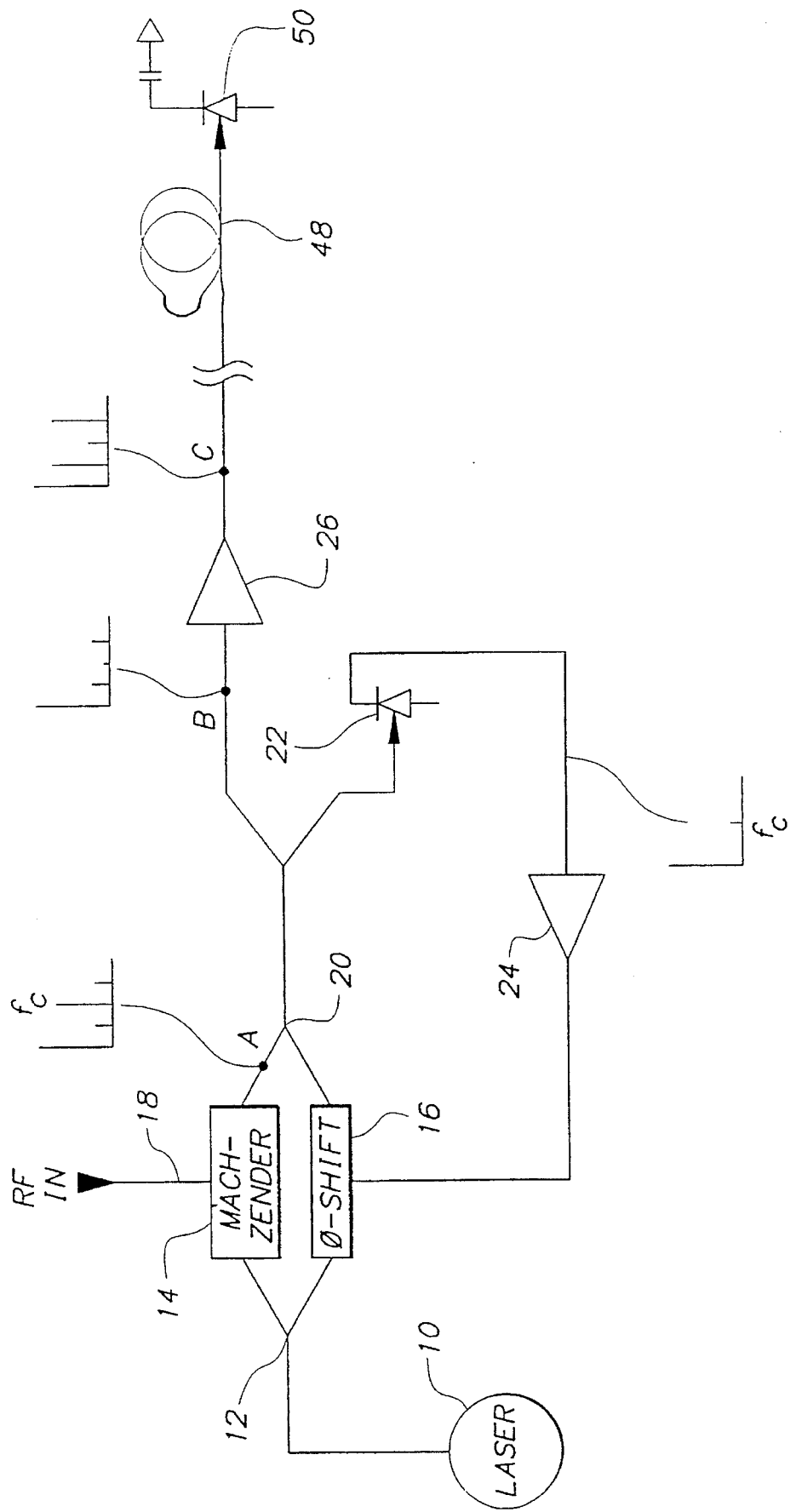
FIG. 1 is a schematic diagram of the double sideband suppressed carrier linearized optical link.

Referring to FIG. 1, the present invention comprises a laser source 10 which provides a coherent lightwave carrier signal upon which information is carried. The lightwave carrier is divided at signal splitter 12 into primary and secondary carrier signals. The primary carrier enters a Mach-Zehnder electro-optical modulator 14. The secondary carrier enters an electro-optical phase shifter 16.

The Mach-Zehnder modulator 14 has a second input 18 for an RF information-bearing signal. The primary carrier signal is divided in the modulator and passes along two optical waveguides. The RF input signal is coupled to electrodes placed in close proximity to the optical waveguides. The variations in intensity of the RF input, corresponding to the nature of the information signal, cause the electrodes to which the RF signal is coupled to set up a varying electromagnetic field around the carrier waveguide. The changing electromagnetic field alters the propagation characteristic of the optical waveguide, changing the relative phase of the carrier signal passing through it. When recombined with the carrier signal from the second waveguide in the Mach-Zehnder modulator, the phase difference between the two carriers causes both constructive and destructive interference, causing variations in the amplitude of the combined carrier signal.

Thus, the output of the Mach-Zehnder modulator 14 is an amplitude modulated optical signal. The spectral characteristic of the amplitude modulated signal emanating from the Mach-Zehnder modulator 14 is shown at the point designated A in FIG. 1. The signal comprises a large carrier component $f_c$ and two information sidebands having far lower magnitudes than the carrier $f_c$.

The modulation index of the amplitude modulated signal at point A is the ratio of the power contained in the information sidebands relative to the power of the carrier. As will be explained below, in order to reduce intermodulation and harmonic distortion, the modulation index must be kept very low, on the order of 2–5%.

If the amplitude modulated signal were coupled directly to a fiber optic transmission medium, the majority of transmitted power would be in the carrier $f_c$, not the information-bearing sidebands. When detected, the carrier would produce a large DC level that would restrict the dynamic range of the optical detector. Transmitting so much non-information bearing carrier signal on the optical link is inefficient. Therefore, it is desirable to both remove the unwanted carrier and enhance the signal power of the information-bearing sidebands coupled to the optical link.

Referring again to FIG. 1, the secondary carrier entering phase shifter 16 is shifted 180° in relation to the phase of the primary carrier coupled to the Mach-Zehnder modulator 14. The phase shifter comprises an optical waveguide with electrodes placed in close proximity to it. A DC voltage applied to the electrodes in the phase shifter creates an electromagnetic field which alters the phase of the optical signal passing along the waveguide. The phase shifted secondary carrier is combined with the modulated output signal from the Mach-Zehnder modulator in a single combiner 20.

The 180° phase relation between the secondary carrier and the primary carrier component of the amplitude modulated signal causes the carrier to be suppressed by destructive interference. A spectral representation of the resulting signal is shown at point B in FIG. 1. The information sidebands are unaffected. The magnitude of the carrier $f_c$ is reduced, the magnitude of the reduction depending on the accuracy of the phase shift applied to the secondary carrier.

The phase shift is controlled by a closed-loop feedback network comprising an optical detector 22 and a signal conditioning circuit 24. A small portion of the signal leaving the double sideband suppressed carrier modulator is diverted to the feedback network. Because any carrier signal present in the modulator output converts to a DC voltage, the optical detector 22 produces an error signal proportion to the magnitude of carrier signal remaining in the suppressed carrier output of the modulator. The error signal may be conditioned by filtering and/or amplification in the conditioning circuit 24 before being input to the phase shifter to control the phase shift applied to the secondary carrier. Though it is possible to suppress the carrier by more than 30 dB, in the present invention it is preferred to limit the carrier suppression to about 30 dB. This is to provide sufficient carrier signal for transmission such that detection may be accomplished without the necessity to introduce a local carrier at the receiving detectors on the link. The suppression may be limited by introducing a fixed offset in the feedback network to prevent the secondary carrier phase shift from being precisely 180° relative to the primary carrier phase.

Figure 2:
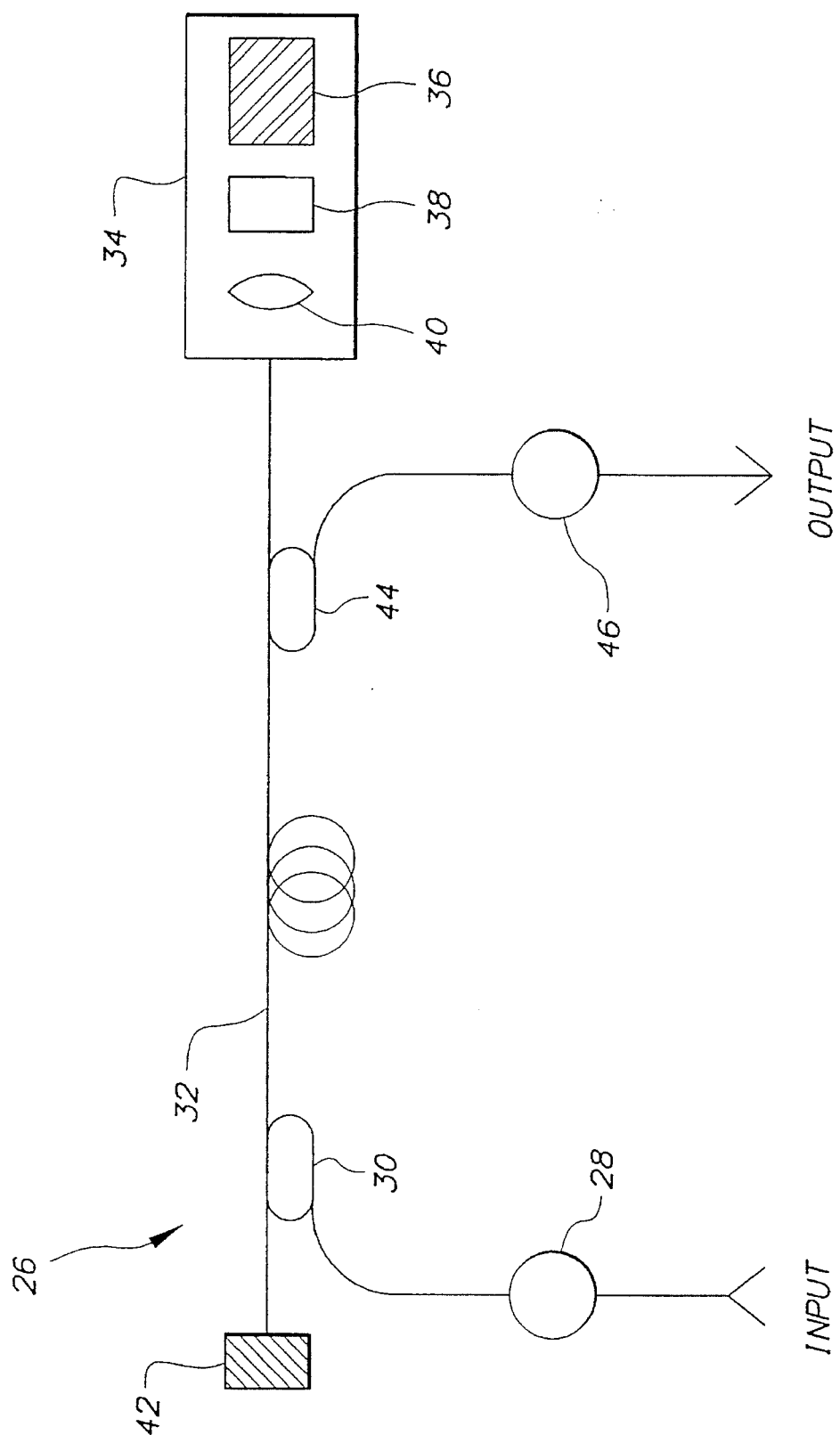
FIG. 2 is an illustration of an exemplary linear optical amplifier for employed in the present invention.

The suppressed carrier signal, as depicted at point B in FIG. 1, is coupled to a linear optical amplifier 26. The optical amplifier 26 is described with reference to FIG. 2. The signal entering the amplifier 26 passes through an optical isolator 28 and enters the amplifier through a wavelength division multiplexer 30. The amplifier comprises a rare earth doped optical fiber segment 32 which is illuminated by a diode-pumped laser 34. A typical diode-pumped laser comprises a diode laser array 36, a gain medium 38 for boosting the power of the emitted laser light, and a lens 40 to focus the light into a coherent beam for coupling into the doped fiber segment 32. The amplifier further comprises an optical termination 42 at the opposite end of the doped fiber segment 32 from the laser array 34.

The fiber optical amplifier is based on the pumping of the $^2F5/2$ transmission of $Yb^+$. The fiber segment is co-doped with $Er^{+3}$ and transfer to the $^4I13/2$ level provides the gain for amplification. The input signal is "spliced" onto the doped fiber segment 32 by means of a wavelength division multiplexer 30. In the Yb-Er system, in excess of 1000 mW of pump power is available for pumping the amplifier. This allows for amplifiers with saturated output powers in excess of 24 dBm. These devices are suitable for amplification of a double sideband suppressed carrier signal. The modulated signal exits the amplifier's doped fiber segment 32 through a second wavelength division multiplexer 44 and passes through a second optical isolator 46. The optical isolators 28, 46 on the input and output ports reduce back-reflections into the modulator on the input side, and into the fiber optic transmission medium on the output side of the amplifier 26.

Referring again to FIG. 1, the signal exiting the amplifier 26 has a spectral characteristic indicated at point C. As shown, the amplitude of the information-bearing sidebands is significantly increased. The magnitude of the carrier frequency $f_c$ is also enhanced, but it remains considerably lower than the magnitude of the information-bearing sidebands.

The benefit of the double sideband suppressed carrier linearizer of the present invention is evident from a comparison of the spectral characteristic of the modulated signal at point A to that at point C in FIG. 1. The signal at point C has a vastly improved effective modulation index than that at point A. That is, far more of the signal power to be transmitted over the optical link is concentrated in the information sidebands at point C than at the output of the Mach-Zehnder modulator at point A.

The signal from the double sideband suppressed carrier linearizer is coupled to an optical transmission medium for transmission on the optical link to one or more detectors 50.

The double sideband suppressed carrier (DSSC) linearized link achieves a wider dynamic range than conventional optical links because it allows the modulator to be operated at a low input drive level. By suppressing the optical carrier signal and boosting the sideband magnitude the DSSC linearizer greatly increases the effective modulation index of the optical signal. The benefits of the present invention are readily apparent with reference to FIGS. 3, 4 and 5.

Figure 3:
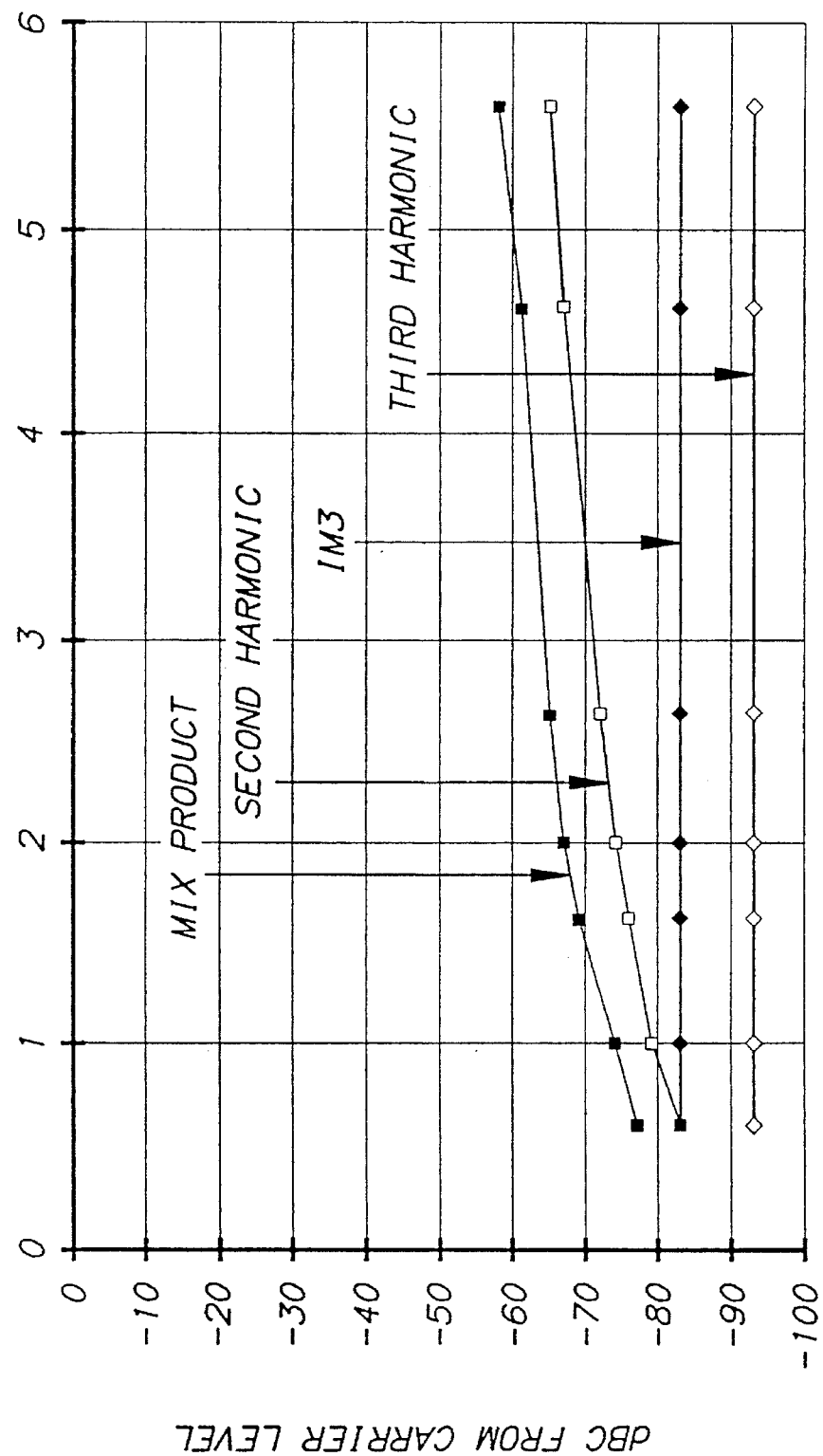
FIG. 3 is a graphical representation of the intermodulation and distortion output from an optical modulator driven at a first input level.

FIG. 3 indicates the output magnitudes of the direct mixing product, the second and third harmonics, and third order intermodulation products of a Mach-Zehnder modulator as a function of the modulator bias point, represented by the horizontal axis in FIG. 3. The amplitude of the mixing products is represented in decibels below the level of the carrier. The input level for this analysis is uniformly −20 dBm.

Figure 4:
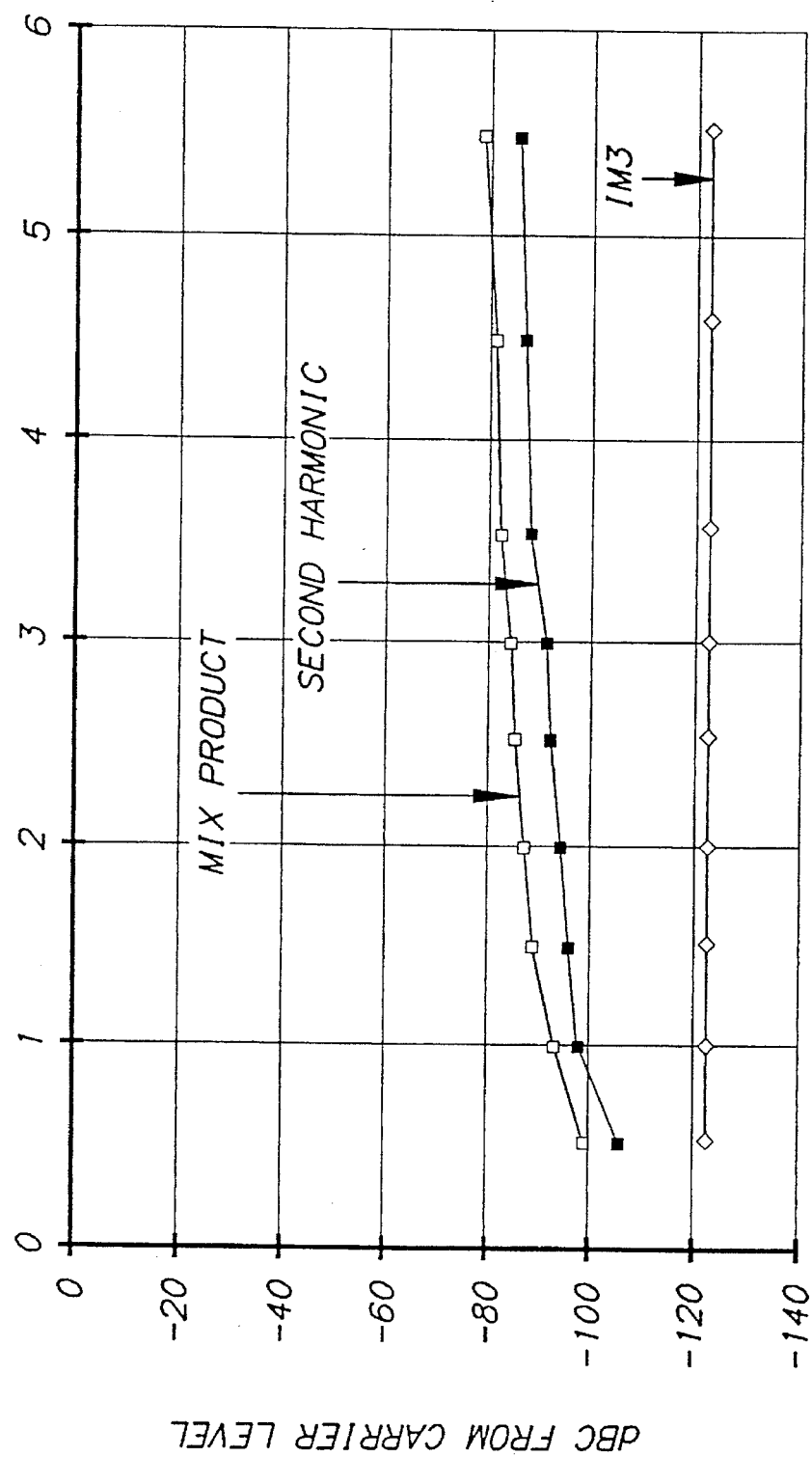
FIG. 4 is a graphical representation of the intermodulation and distortion output from an optical modulator driven at a second input level.

The plotted points in FIG. 3 represent the results of a fast Fourier transform (FFT) performed on a two-tone signal with the input signal held constant at −20 dBm. By way of comparison, FIG. 4 is a graph 10 of the same analysis performed with the input level held constant at −40 dBm. At comparable points on each graph, for instance the two-volt bias level, the differences are readily apparent. In FIG. 3, the separation between the mixing product and third order intermodulation product is a mere 14 dB. In FIG. 4 the third order intermodulation product is more than 30 dB below the level of the principal mixing product, that is, the information signal. The third order harmonic suppression in FIG. 4 is in excess of 50 dB compared to only about 25 dB in FIG. 3 at the higher drive level. Thus, operating the modulator at a low input level confines the modulator to a more linear operating point than a higher drive level. Confining the modulator to its linear operating range minimizes intermodulation and harmonic distortion.

Figure 5:
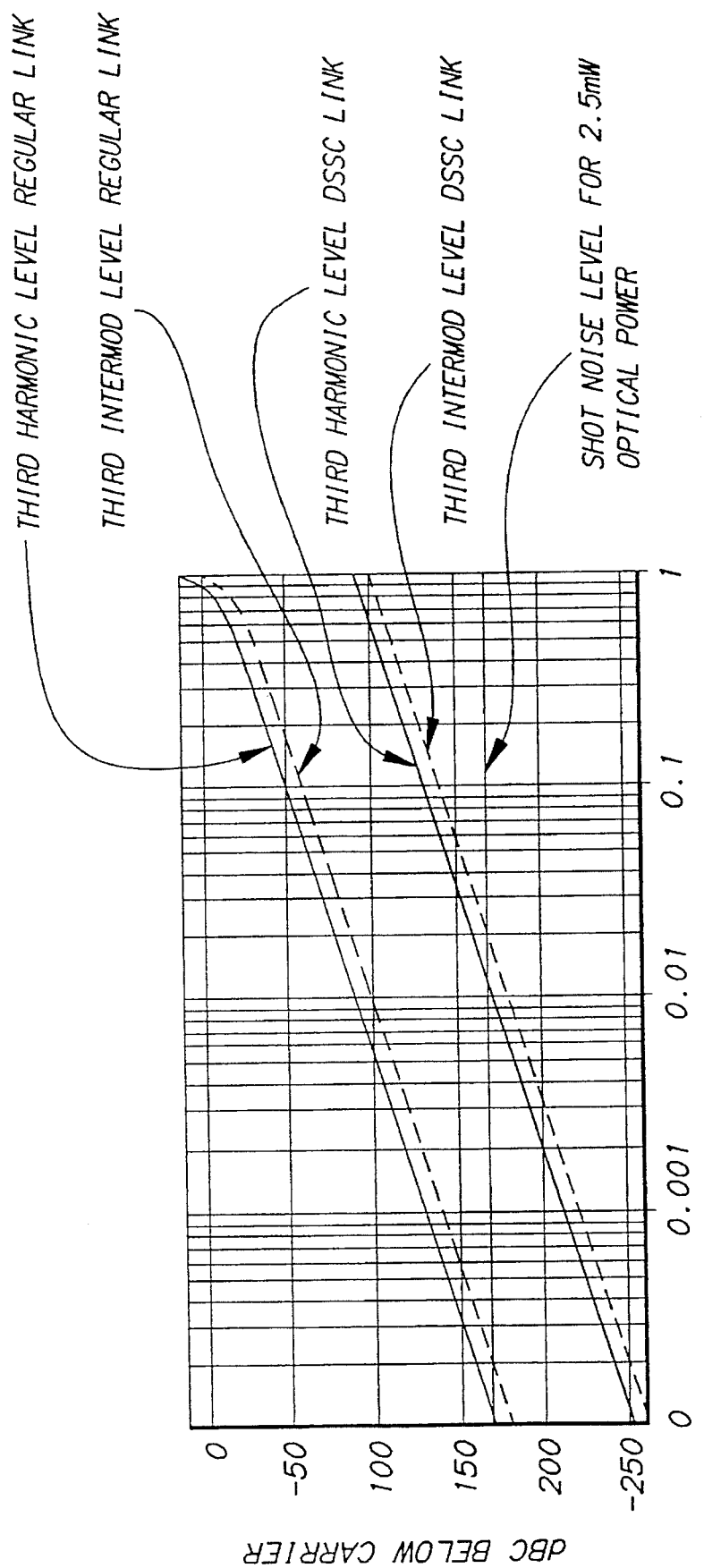
FIG. 5 is a graphical representation of the comparative third harmonic and third order intermodulation products of a standard optical link and a link in accordance with the present invention.

FIG. 5 represents the third order intermodulation distortion and third harmonic level as a function of modulation index. Curves are plotted for both a regular optical link and the double sideband suppressed carrier linearized link. It can be seen that the distortion products associated with the double sideband suppressed carrier link are uniformly about 70 dB further below the carrier level than those of a regular optical link at comparable values of modulation index. Thus, a system using the double sideband suppressed carrier linearizer will yield a substantial improvement of dynamic range and instantaneous bandwidth, while the overall performance will be limited by the dynamic range performance of external RF components. This type of state-of-the art improvement in dynamic range will not be limited to narrow band RF. The only bandwidth limitation of this system is related to the RF matching of the Mach-Zehnder modulator, or the operational bandwidth of the Mach-Zehnder modulator.

The optical amplification of the double sideband suppressed carrier signal has the effect of increasing the effective depth of modulation from 2–5% in typical externally modulated systems up to 100% in the double sideband suppressed carrier linearized system. This type of amplification adds directly to system margin since most of the added power goes into the information carrying part of the signal and not to the DC component. There is no effect on the spurious free dynamic range of the system because of the linearity of the optical amplifier.

The present invention may be embodied in other specific forms without departing from the spirit or essential attributes thereof and, accordingly, reference should be made to the appended claims, rather than to the foregoing specification, as indicating the scope of the invention.

What is claimed is:

1. A wide dynamic range optical link comprising a laser source for producing a lightwave carrier output at a predetermined power level and wavelength;

a double sideband suppressed carrier optical modulator having the lightwave carrier as a first input and an RF information-bearing signal as a second input, said modulator producing a suppressed carrier modulated signal output having a characteristic modulation index, said double sideband suppressed carrier optical modular comprising a signal divider for dividing the lightwave carrier into primary and secondary carriers, a Mach-Zehnder optical modulator into which the primary carrier is input and modulated by the RF information bearing signal, producing a modulated signal comprising information sidebands and a primary carrier component, a feedback controlled phase shifter in which phase of the secondary carrier is shifted 180 degrees from phase of the primary carrier, a signal combiner into which are input the modulated signal and the phase shifted secondary carrier, the combination of said signals causing the controlled suppression of the carrier component in the output of the signal combiner, and a feedback loop for controlling the phase shifter comprising an optical detector for detecting the amplitude of the carrier component in the suppressed carrier signal and means for providing a control signal derived from the detected carrier amplitude to the phase shifter;

a linear optical amplifier for increasing the modulation index of the modulated signal output from the suppressed-carrier modulator, the output of said amplifier being input to an input end of an optical fiber medium for transmission of the modulated signal to a desired destination; and at least one optical signal detector at said destination adjacent an output end of the optical fiber for detecting the modulated signal.

2. The optical link of claim 1, wherein the linear optical amplifier comprises a pumped diode laser illuminating a rare earth doped optical fiber segment, said fiber segment having first and second ends, the laser being input to the first end of the fiber.

3. The optical link of claim 2, wherein the linear optical amplifier further comprises input wavelength division multiplexers and output wavelength division demultiplexers for enabling the suppressed carrier modulated signal to enter and exit the fiber segment.

4. The optical link of claim 3, wherein the optical link further comprises first and second optical isolators at the input and output of the amplifier respectively for preventing the pumped laser signal in the amplifier device from feeding back into the modulator and forward into the optical fiber transmission medium.

5. The optical link of claim 4, wherein the linear optical amplifier further comprises an optical termination connected to the second end of the rare earth doped optical fiber segment.

6. The optical link of claim 2, wherein the rare earth doping elements in the amplifier fiber segment include ytterbium and erbium.

7. The optical link of claim 2, wherein the amplifier fiber segment comprises a sole rare earth doping element, said element being erbium.

8. The optical link of claim 1, wherein the Mach-Zehnder modulator, the signal splitter, and the phase shifter are fabricated on a single lithium niobate substrate.

9. A wide dynamic range optical link comprising a laser source for producing a lightwave carrier output at a predetermined power level and wavelength;

a double sideband suppressed carrier optical modulator having the lightwave carrier as a first input and an RF information-bearing signal as a second input, said modulator producing a suppressed carrier modulated signal output having a characteristic modulation index, said double sideband suppressed carrier optical modulator comprising a signal splitter for dividing the lightwave carrier into primary and secondary carriers, a Mach-Zehnder optical modulator into which the primary carrier is input and modulated by the RF information bearing signal, producing a modulated signal comprising information sidebands and a primary carrier component, a feedback controlled phase shifter in which phase of the secondary carrier is shifted 180 degrees from phase of the primary carrier, a signal combiner into which are input the modulated signal and the phase shifted secondary carrier, the combination of said signals causing the controlled suppression of the carrier component in the output of the signal combiner, and a feedback loop for controlling the phase shifter comprising an optical detector for detecting the amplitude of the carrier component in the suppressed carrier signal and means for providing a control signal derived from the detected carrier amplitude to the phase shifter; and a linear optical amplifier for increasing the modulation index of the modulated signal output from the suppressed-carrier modulator, said linear optical amplifier comprising a pumped diode laser illuminating a rare earth doped optical fiber segment, input wavelength division multiplexers and output wavelength division demultiplexers for enabling the suppressed carrier modulated signal to enter and exit the amplifier fiber segment, and an optical termination connected to the second end of the rare earth doped optical fiber, the output wavelength division demultiplexer being connected to an optical fiber medium for transmission of the modulated signal.

10. The optical link of claim 9, wherein the rare earth doping elements in the amplifier fiber segment include ytterbium and erbium.

11. The optical link of claim 9, wherein the amplifier fiber segment comprises a sole rare earth doping element, said element being erbium.

12. The optical link of claim 9, wherein the Mach-Zehnder modulator, the signal splitter, and the phase shifter are fabricated on a single lithium niobate substrate.

13. A wide dynamic range optical link comprising a laser source for producing a lightwave carrier output at a predetermined power level and wavelength;

a double sideband suppressed carrier optical modulator having the lightwave carrier as a first input and an RF information-bearing signal as a second input, said double sideband suppressed carrier modulator comprising a signal splitter for dividing the lightwave carrier into primary and secondary carriers, a Mach-Zehnder optical modulator into which the primary carrier is input and modulated by the RF information signal to produce a modulated signal comprising information sidebands and a primary carrier component, a feedback controlled phase shifter in which phase of the secondary carrier is shifted 180 degrees from phase of the primary carrier, a signal combiner into which are input the modulated signal and the phase shifted secondary carrier, the combination of said signals causing the controlled suppression of the carrier component in the output of the signal combiner, and a feedback loop for controlling the phase shifter comprising an optical detector for detecting the amplitude of the carrier component in the suppressed carrier signal, and a means for providing a control signal derived from the detected carrier amplitude to the phase shifter, said double sideband suppressed carrier modulator producing a suppressed carrier modulated signal output having a characteristic modulation index; and a linear optical amplifier for increasing the modulation index of the modulated signal output from the suppressed-carrier modulator, said linear optical amplifier comprising a pumped diode laser illuminating a rare earth doped optical fiber segment, input wavelength division multiplexers and output wavelength division demultiplexers for enabling the suppressed carrier modulated signal to enter and exit the amplifier fiber segment, an optical termination connected to the second end of the rare earth doped optical fiber, the output wavelength division demultiplexer being connected to an optical fiber medium for transmission of the modulated signal.

14. The optical link of claim 13, wherein the rare earth doping elements in the amplifier fiber segment include ytterbium and erbium.

* * * * *